(12) United States Patent
Davis et al.

(10) Patent No.: US 6,719,311 B2
(45) Date of Patent: Apr. 13, 2004

(54) VEHICLE STEERING ASSEMBLY

(75) Inventors: Mark A. Davis, Portage, MI (US); Keith Kobetitsch, Mattawan, MI (US)

(73) Assignee: Dana Corporation, Toledo, OH (US)

( * ) Notice: Subject to any disclaimer, the term of this patent is extended or adjusted under 35 U.S.C. 154(b) by 103 days.

(21) Appl. No.: 09/969,409

(22) Filed: Oct. 2, 2001

(65) Prior Publication Data

US 2002/0121758 A1 Sep. 5, 2002

Related U.S. Application Data

(60) Provisional application No. 60/272,655, filed on Mar. 1, 2001.

(51) Int. Cl.[7] ................................................. B62D 7/16
(52) U.S. Cl. ............................. 280/93.502; 280/93.508
(58) Field of Search ........................ 280/93.502, 93.503, 280/93.506, 93.507, 93.508, 771, 93.51; 180/409, 416, 439

(56) References Cited

U.S. PATENT DOCUMENTS

| | | | | |
|---|---|---|---|---|
| 2,974,974 A | * | 3/1961 | Merritt ........................ | 180/409 |
| 4,161,327 A | * | 7/1979 | Honecker .............. | 280/93.507 |
| 4,522,418 A | * | 6/1985 | Struck et al. .......... | 280/93.507 |
| 4,708,363 A | * | 11/1987 | Hata ........................... | 280/771 |
| 4,717,175 A | | 1/1988 | Arai et al. ................. | 280/96.1 |
| 5,143,400 A | | 9/1992 | Miller et al. ................ | 280/661 |
| 5,312,123 A | * | 5/1994 | Hurlburt ................. | 280/93.503 |
| 5,769,180 A | * | 6/1998 | Momose et al. ............ | 180/424 |
| 6,179,308 B1 | * | 1/2001 | Mielauskas et al. ... | 280/93.512 |
| 6,283,483 B1 | * | 9/2001 | Johnson et al. ........ | 280/86.758 |

* cited by examiner

*Primary Examiner*—David R. Dunn
(74) *Attorney, Agent, or Firm*—Dykema Gossett PLLC

(57) ABSTRACT

A steering assembly is provided for steering a pair of vehicle wheels. The assembly includes a tie rod assembly having first and second tie rods. Each of the tie rods has an inboard end and an outboard end. The inboard ends may be coupled to the output member of a steering gear or they may be supported on a movable support member. The outboard ends are coupled to the vehicle wheels and, in particular, to tie rod arms extending from steering knuckles. The inboard ends of the tie rods are positioned forward of the outboard ends of the tie rods relative to the forward direction of vehicle travel when the vehicle wheels are facing forward. As a result, the effective length of the tie rod assembly increases as the turn angle of the vehicle wheels increases thereby reducing toe out of the vehicle wheels and tire wear and allowing sufficient clearance with wheel and brake components including brake drums found in conventional drum brake systems.

18 Claims, 4 Drawing Sheets

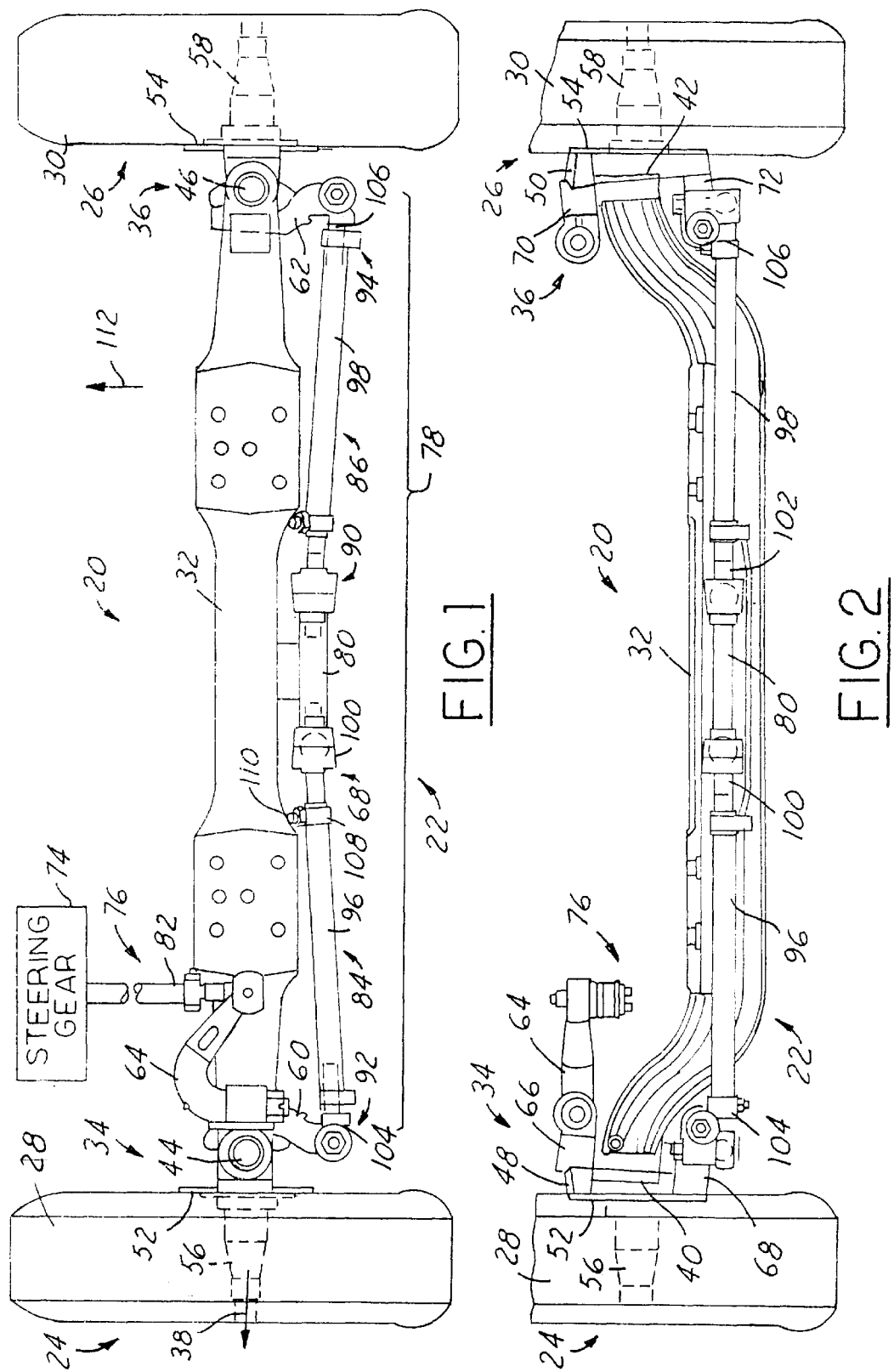

VEHICLE STEERING ASSEMBLY

This application claims priority to U.S. Provisional Application Serial No. 60/272,655 filed Mar. 1, 2001, the entire disclosure of which is incorporated herein by reference.

BACKGROUND OF THE INVENTION

1. Field of the Invention

This invention relates to vehicle steering systems and, in particular, to a tie rod assembly and tie rod orientation used in a steering system.

2. Disclosure of Related Art

A conventional motor vehicle includes a pair of steered wheels disposed at opposite ends of a steer axle. Steering knuckles are rotatably supported on each end of the axle through kingpins or other conventional means and the wheels are supported on spindles that extend from the steering knuckles. The wheels are steered using a steering linkage that couples one of the steering knuckles to a steering gear that is in turn responsive to operation of a steering wheel in the vehicle. The steering knuckles are coupled together using a tie rod assembly so that the wheels are turned at coordinated angles during a turn.

In most conventional steering systems, the tie rod assembly includes a single tie rod linking the opposed steering knuckles. In vehicles having relatively large wheelbases, however, the ends of the tie rod often do not have sufficient clearance with the wheel or brake components such as the brake drums, brake discs, calipers, caliper mountings or brake dust shields found in conventional drum brake systems for the wheels. In order to provide sufficient clearance, optimal steering geometry is often sacrificed. Several steering systems have also been proposed in which the tie rod assembly includes a pair of tie rods linking the opposed steering knuckles. These conventional systems suffer from several disadvantages, however. First, the tie rod arms coupling the tie rod to the steering knuckle have generally varied in size, shape and/or configuration. As a result separate forging operations have to be performed for each of the tie rod arms thereby increasing tooling, inventory, and maintenance costs. Second, the outboard ends of the two tie rods continue to have insufficient clearance with the conventional wheel and brake components.

There is thus a need for a steering assembly that will minimize or eliminate one or more of the above-mentioned deficiencies.

SUMMARY OF THE INVENTION

The present invention provides a steering assembly for adjusting the steer angle of a pair of steered wheels on a motor vehicle and, in particular, a heavy truck.

A steering assembly in accordance with the present invention includes first and second tie rods. Each of the tie rods has an inboard end and an outboard end. The inboard ends of each tie rod may be coupled directly to a steering gear. Alternatively, the inboard ends of each tie rod may be coupled to a movable support member. The outboard ends of each tie rod are connected to the vehicle wheels and, in particular, may be connected to steering knuckles supporting the vehicle wheels. In accordance with the present invention, the inboard end of at least one of the first and second tie rods is located forward of the corresponding outboard end of the at least one tie rod relative to the forward direction of travel of the vehicle when the first and second wheels are facing forward.

A steering assembly in accordance with the present invention has several advantages as compared to conventional steering systems. First, the tie rod arms coupling the two tie rods to the steering knuckles may be identical in construction. As a result, a single forging operation can be used to produce both tie rod arms thereby reducing tooling, inventory, and maintenance costs. Second, moving the inboard ends of the tie rods forward of the outboard ends increases the effective length of the tie rod assembly (as defined by the distance between the outboard ends of the two tie rods) as the nominal wheel turn angle is increased. As a result, a single outboard end position for the tie rods can be used effectively over a wider range of wheelbases and/or the outboard end position of the tie rods can be located closer to the vehicle centerline and further from conventional wheel and brake components. This reduces the number and variety of tie rods required to accommodate variations in vehicle design and allows consideration of alternative positions and designs for wheel and brake components. Further, the increase in the effective length of the tie rod assembly reduces toe out as the wheels are turned and the resulting tire wear over a relatively large wheelbase range. Finally, the use of two tie rods that are approximately one half of the length of the single tie rod found in most conventional assemblies results in much higher tie rod natural frequencies that are well above the accepted range of brake sprag vibration. As a result, brake sprag may be eliminated as a limiting design criteria for tie rods.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a top plan view of a steer axle assembly incorporating a steering assembly in accordance with the present invention.

FIG. 2 is a rear plan view of the steer axle assembly of FIG. 1.

DETAILED DESCRIPTION OF THE PREFERRED EMBODIMENT

Figure 3:
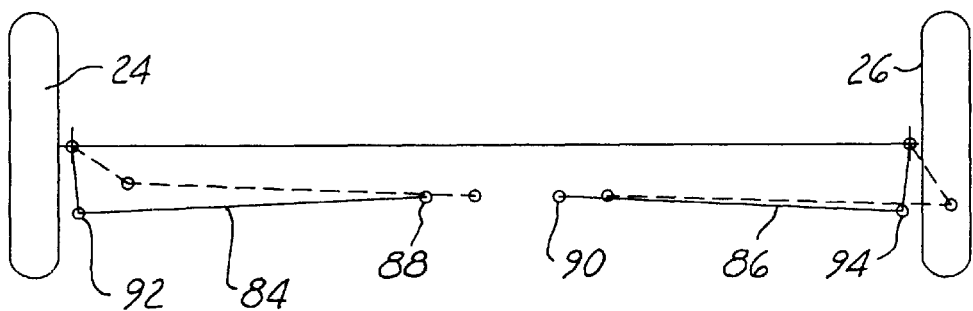
FIG. 3 is a diagrammatic view illustrating a change in position of the tie rods of the inventive steering assembly as the vehicle wheels are turned from a forward facing direction to an forty-five degree angle relative to the forward direction.

Referring now to the drawings wherein like reference numerals are used to identify identical components in the various views, FIGS. 1–2 illustrate a steer axle assembly 20 incorporating a steering assembly 22 in accordance with the present invention. Axle assembly 20 is provided to support the frame (not shown) of a vehicle on a pair of steerable vehicle wheels 24, 26 bearing tires 28, 30. Assembly 20 is particularly adapted for use in heavy trucks. It should be understood, however, that the present invention is not limited to use in heavy trucks and may be used in a wide variety of vehicles. In addition to steering assembly 22, axle assembly 20 may also include an axle 32 and steering knuckles 34, 36.

Axle 32 is provided to support the vehicle frame on tires 28, 30 and also provides mounting surfaces for various suspension and brake components. Axle 32 is conventional in the art and may be made from conventional metals and metal alloys such as steel. Axle 32 may comprise a forged I-beam having a longitudinal axis 38. It should be understood, however, that the size, shape, and configuration of axle 32 may be varied without departing from the spirit of the present invention. Axle 32 may define a boss 40, 42 at either axial end. The bosses 40, 42 may define through bores configured to receive conventional kingpins 44, 46. Kingpins 44, 46 may be held against rotation within bosses 40, 42 using draw keys (not shown) in a known manner.

Steering knuckles 34, 36 are provided to rotatably support wheels 24, 26 on axle 32. Knuckles 34, 36 are conventional in the art any may be made from conventional metals and metal alloys such as steel. Knuckles 34, 36 may include knuckle bodies 48, 50, brake mounting plates 52, 54, spindles 56, 58, and tie rod arms 60, 62, respectively. One of the knuckles 34 may also include a steering arm 64.

Knuckle bodies 48, 50 provide structural support for the other components of knuckles 34, 36. Bodies 48, 50 also define a pair of spaced bosses 66, 68 and 70, 72, respectively, having through bores. The knuckle bosses 66, 68 and 70, 72 are disposed on either side of axle bosses 40, 42 and the bores in bosses 66, 68 and 70, 72 are aligned with the bores in axle bosses 40, 42. The bores are configured to receive kingpins 44, 46 and conventional bushings or bearings may be disposed within the bores of bosses 66, 68 and 70, 72 to allow knuckles 34, 36 to rotate on kingpins 44, 46.

Plates 52, 54 are provided to mount components (not shown) of conventional vehicle braking systems. The present invention offers particular benefits for vehicles incorporating drum brake systems. It should be understood, however, that the present invention may find application in vehicles having other conventional braking systems. Plates 52, 54 may be integral with bodies 48, 50, respectively, and may be generally circular in shape. It should be understood, however, that the size, shape, and configuration of plates 52, 54 may vary depending upon the vehicle braking system used in a particular application.

Spindles 56, 58 are provided to support wheels 24, 26. Spindles 56, 58 are conventional in the art and extend from bodies 48, 50. Spindles 56, 58 may be integral with bodies 48, 50 or may comprise separate components that are welded or otherwise coupled to bodies 48, 50. Wheels 24, 26 may be supported for rotation on spindles 56, 58 using conventional wheel bearings (not shown).

Tie rod arms 60, 62 are provided to couple knuckles 34, 36 to a tie rod assembly of steering assembly 22 as discussed hereinbelow. Arms 60, 62 are conventional in the art and extend from knuckle bodies 48, 50. Arms 60, 62 may be integral with bodies 48, 50 or coupled to bodies 48, 50 in a known manner. As will be understood by those in the art, the size, shape, and orientation of arms 60, 62 may vary depending upon design requirements associated with axle assembly 20. In accordance with the present invention, however, arms 60, 62 may be identical in construction and a single forging operation can be used to produce both tie rod arms 60, 62 thereby reducing tooling, inventory, and maintenance costs.

Steering arm 64 is provided to couple knuckle 34 to a steering linkage and is also conventional in the art. Steering arm 64 may extend from knuckle body 48 and may be integral with body 48 or coupled to body 48 in a known manner. As will be understood by those in the art, the size, shape, and orientation of arm 64 may also vary depending upon design requirements associated with axle assembly 20.

Steering assembly 22 controls the steer angle of wheels 24, 26 and allows the vehicle to be steered. Assembly 22 may include a steering gear 74, a steering linkage 76, a tie rod assembly 78, and means, such as member 80, for supporting tie rod assembly 78.

Steering gear 74 is provided to translate motion of a vehicle steering wheel to wheels 24, 26. Gear 74 is conventional in the art and may have an input member (not shown) coupled to a vehicle steering column (not shown) and an output member (not shown) coupled to steering linkage 76. Alternatively, the output member of steering gear 74 may be directly coupled to the tie rod assembly 78 as illustrated, for example, in the rack and pinion steering arrangement shown in FIG. 1 of U.S. Pat. No. 4,717,175, the entire disclosure of which is incorporated herein by reference. In this latter embodiment, the steering gear 74 is preferably mounted remote from axle 32 (i.e., is not coupled to axle 32). This configuration allows the use of shorter tie rod arms in tie rod assembly 78 and the use of straight tie rod arms as opposed to curved or bent arms.

Steering linkage 76 is provided to couple the output member of steering gear 74 to steering arm 64 of knuckle 34. Linkage 76 is conventional in the art and may comprise one or more links coupled together to translate motion of the output member of gear 74 to motion of steering arm 64. For example, linkage 76 may include a conventional pitman arm (not shown) coupled to the output member of steering gear 74 and a drag link 82 coupling the pitman arm to steering arm 64 of knuckle 34. Each link may be made from conventional metals and metal alloys, such as steel.

Tie rod assembly 78 is provided to couple steering knuckles 34, 36 in order to cause corresponding rotational movements in each of wheels 24, 26. Assembly 78 includes a pair of tie rods 84, 86 having inboard ends 88, 90 and outboard ends 92, 94, respectively. Each of tie rods 84, 86 may include an arm 96, 98, inboard ball joints 100, 102, and outboard tie rod ends 104, 106, respectively. Each of tie rods 84, 86 may also include means, such as brackets 108 and fasteners 110 for coupling joints 100, 102 and tie rod ends 104, 106 to arms 96, 98. In accordance with the present invention, tie rods 84, 86 may each be approximately one half of the length of a conventional single tie rod, resulting in much higher tie rod natural frequencies that are well above the accepted range of brake sprag vibration. As a result, brake sprag may be eliminated as a limiting design criteria for tie rods 84, 86.

Arms 96, 98 are provided to support and position ball joints 100, 102 and tie rod ends 104, 106. Each longitudinal end of each arm 96, 98 may include a threaded opening configured to receive one of ball joints 100, 102 and tie rod ends 104, 106.

Ball joints 100, 102 are provided to allow movement of inboard ends 88, 90 of tie rods 84, 86 relative to support member 80. Joints 100, 102 are conventional in the art and may include threaded shanks (not shown) sized to be received within the inboard end 88, 90 of arms 96, 98.

Tie rod ends 104, 106 are provided to allow rotational movement of outboard ends 92, 94 of tie rods 84, 86 relative to arms 60, 62 of knuckles 34, 36. Tie rod ends 104, 106 are also conventional in the art and may include threaded shanks (not shown) sized to be received within the outboard ends 92, 94 of arms 96, 98. Tie rod ends 104, 106 may further include sockets (not shown) configured to receive tie rod balls (not shown) having threaded shanks extending therefrom that are sized to be received by arms 60, 62 of knuckles 34, 36.

Support member 80 is provided to support inboard ends 88, 90 of tie rods 84, 86 and to couple inboard ends 88, 90. Member 80 may be coupled to axle 32 or to another structural element of the vehicle. Member 80 is capable of movement along axle 32 or the element in a direction generally parallel to axis 38 of axle 32. The size, structure, and configuration of member 80 may vary depending upon design requirements associated with axle assembly 20.

Figure 4:
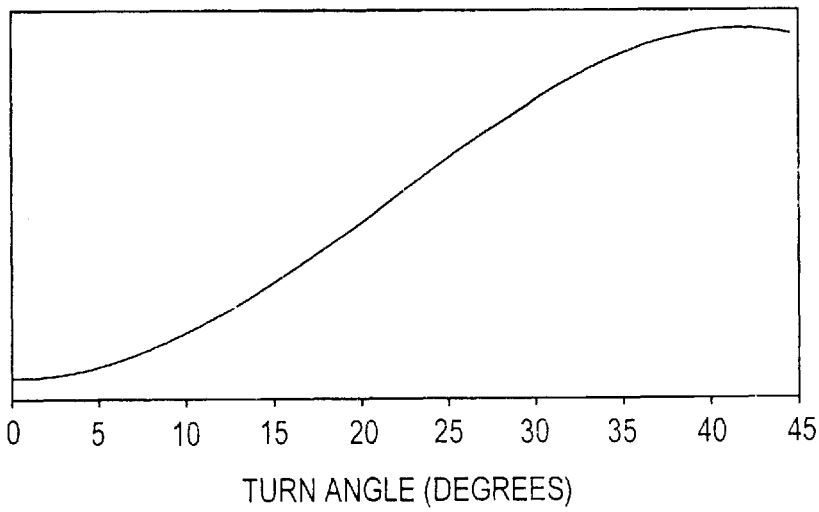
FIG. 4 is a graph illustrating the change in distance between the outboard ends of the tie rods of the inventive steering assembly as the vehicle wheels are turned from a forward facing direction to an forty-five degree angle relative to the forward direction.

Referring to FIG. 1, in accordance with the present invention inboard ends 88, 90 of tie rods 84, 86 are located forward of outboard ends 92, 94 of tie rods 84, 86 relative to the forward direction of vehicle travel (illustrated by arrow 112) when wheels are facing forward. Referring now to FIG. 3, a diagrammatic view illustrates the positions of tie rods 84, 86 while the vehicle wheels 24, 26 are facing forward (indicated by the solid line) and while the wheels 24, 26 are turned at an angle of forty-five (45) degrees relative to the forward facing direction (broken line). As wheels 24, 26 are turned, the positions of tie rods 84, 86 change. One component of this movement is in a transverse direction to the direction of vehicle travel. Another component of this movement is in a direction parallel to the direction of vehicle travel. At a predetermined angle, the outboard end 92, 94 of one of tie rods 84, 86 (tie rod 84 in FIG. 3) becomes positioned forward of the inboard end 88, 90 of the tie rod 84, 86. This angle will vary depending upon the length of tie rods 84, 86 among other factors. Referring to FIG. 4, as the vehicle wheels 24, 26 are turned from the forward facing direction to a forty-five degree angle relative to the forward facing direction, the distance between outboard ends 92, 94 of tie rods 84, 86 increases thereby increasing the effective length of tie rod assembly 78. The increase in the effective length of assembly 78 allows a greater offset of the tie rod balls found in the tie rod ends 104, 106. As a result, a common outboard end position for tie rods ends 104, 106 can be used over a wide range of wheelbases and/or the outboard end position of tie rod ends 104, 106 can be located closer to the vehicle centerline and further from conventional wheel and brake components. This reduces the number and variety of tie rods required to accommodate variations in vehicle design and allows consideration of alternative positions and designs for wheel and brake components. The increase in the effective length of tie rod assembly 78 also reduces toe out of the wheels 24, 26 and tire wear over a relatively large wheelbase range. In one test, the inventive steering assembly 22 showed acceptable toe-out in wheelbases ranging from 160 inches to 360 inches.

Figure 5:
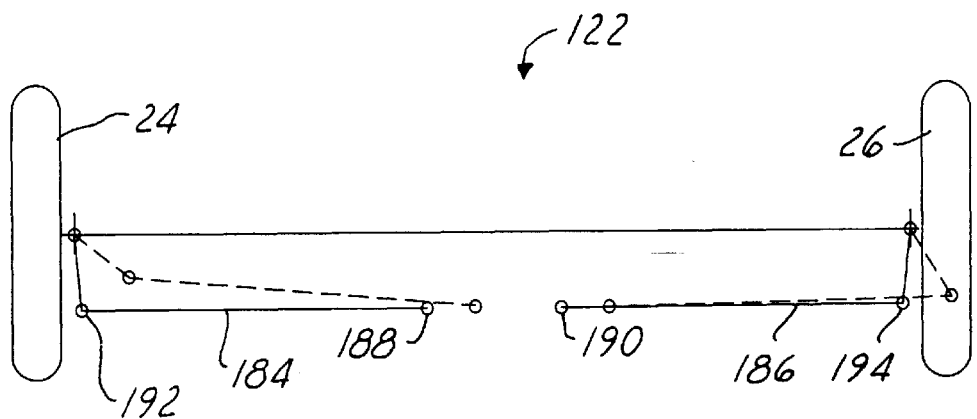
FIG. 5 is a diagrammatic view illustrating a change in position of a pair of tie rods, in a steering assembly wherein the outboard ends of the tie rods are in line with the inboard ends of the tie rods while the vehicle wheels are facing forward, as the vehicle wheels are turned from a forward facing direction to an forty-five degree angle relative to the forward direction.
Figure 6:
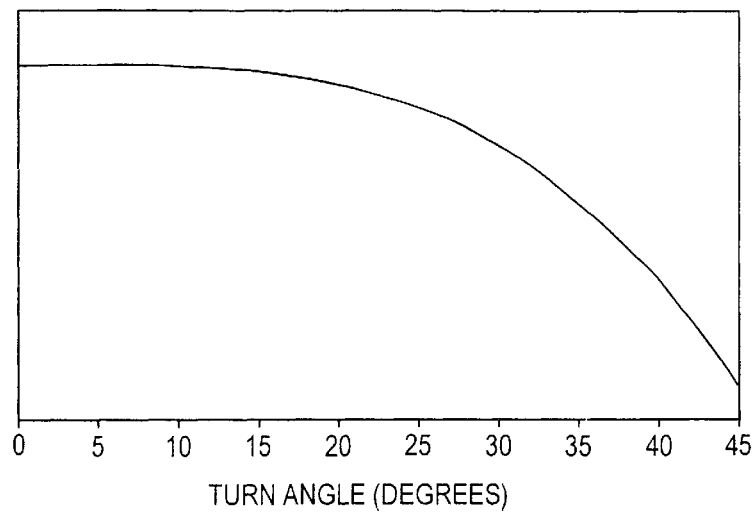
FIG. 6 is a graph illustrating the change in distance between the outboard ends of the tie rods in the steering assembly of FIG. 5 as the vehicle wheels are turned from a forward facing direction to a forty-five degree angle relative to the forward direction.
Figure 7:
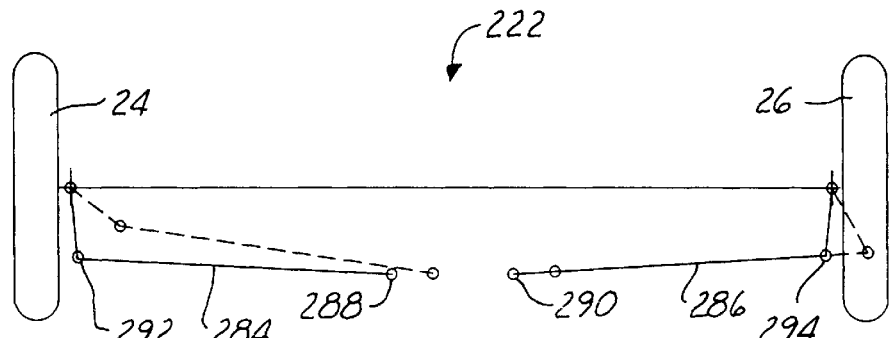
FIG. 7 is a diagrammatic view illustrating a change in position of a pair of tie rods, in a steering assembly wherein the outboard ends of the tie rods are forward of the inboard ends of the tie rods while the vehicle wheels are facing forward, as the vehicle wheels are turned from a forward facing direction to an forty-five degree angle relative to the forward direction.
Figure 8:
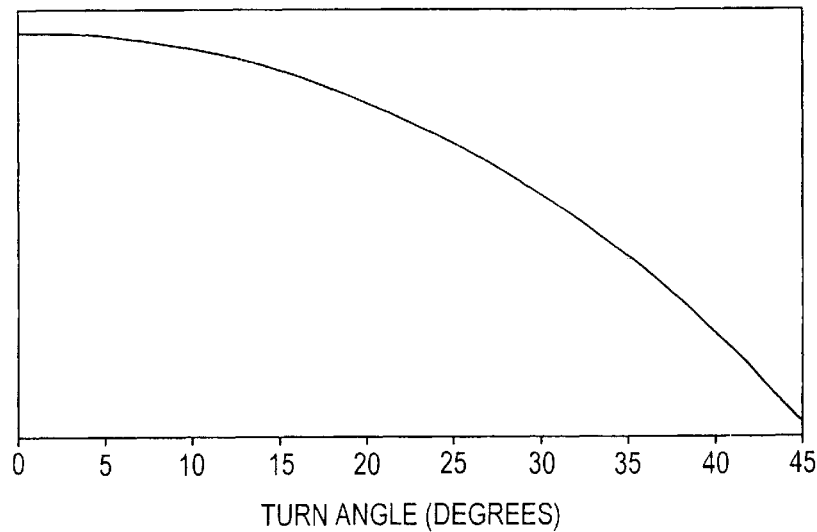
FIG. 8 is a graph illustrating the change in distance between the outboard ends of the tie rods in the steering assembly of FIG. 7 as the vehicle wheels are turned from a forward facing direction to a forty-five degree angle relative to the forward direction.
Figure 9:
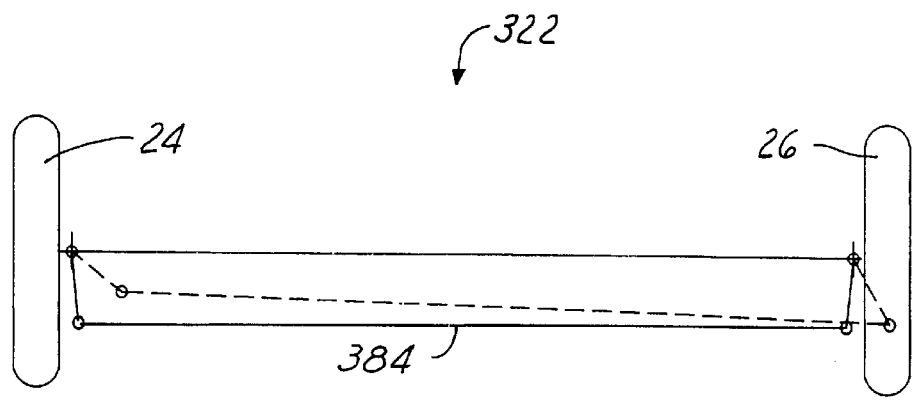
FIG. 9 is a diagrammatic view illustrating a change in position of a tie rod, in a steering assembly having a single tie rod, as the vehicle wheels are turned from a forward facing direction to an forty-five degree angle relative to the forward direction.
Figure 10:
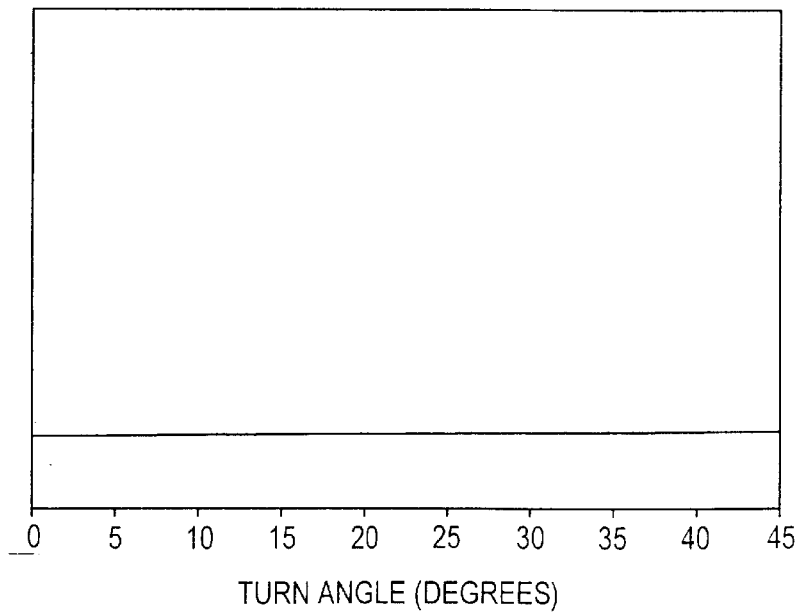
FIG. 10 is a graph illustrating the change in distance between the outboard ends of the tie rod in the steering assembly of FIG. 9 as the vehicle wheels are turned from a forward facing direction to a forty-five degree angle relative to the forward direction.

Referring now to FIGS. 5–10, the inventive steering assembly 22 may be contrasted with other conventional or theoretical steering assemblies. FIG. 5 illustrates a steering assembly 122 having two tie rods 184, 186 in which the inboard ends 188, 190 and the outboard ends 192, 194 of the tie rods 184, 186 are equidistant from axis 38 while wheels 24, 26 are facing forward (i.e., neither of the inboard or outboard ends is forward of the other). Referring to FIG. 6, as the vehicle wheels 24, 26 are turned from a forward facing direction to an angle of forty-five (45) degrees relative to the forward facing direction, the effective length of the tie rod assembly decreases thereby causing increased toe out and tire wear for vehicles having greater than a predetermined wheelbase. In one test, the steering assembly 122 of FIG. 5 showed acceptable toe-out in wheelbases ranging only from 160 inches to 270 inches. FIG. 7 illustrates a steering assembly 222 having two tie rods 284, 286 in which the outboard ends 292, 294 of the tie rods 284, 286 are forward of the inboard ends 288, 290 of the tie rods 284, 286 relative to the forward direction of vehicle travel when the vehicle wheels 24, 26 are facing forward. Referring to FIG. 8, as the vehicle wheels 24, 26 are turned from a forward facing direction to an angle of forty-five (45) degrees relative to the forward facing direction, the effective length of the tie rod assembly again decreases thereby causing increased toe out and tire wear in vehicles having certain wheelbases. In one test, the steering assembly of FIG. 7 showed acceptable toe-out only in wheelbases ranging from 160 inches to 220 inches. Finally, FIG. 9 illustrates a steering assembly 322 having a single tie rod 384 coupling the steering knuckles. Referring to FIG. 10, as the vehicle wheels 24, 26 are turned from a forward facing direction to an angle of forty-five (45) degrees relative to the forward facing direction, the effective length of the tie rod assembly remains the same. Although this steering assembly 322 does not suffer as great a degree of toe out and tire wear, the resulting levels are still relatively high and the assembly 322 suffers from clearance issues when used with conventional drum brake systems.

As described hereinabove, a steering assembly 22 in accordance with the present invention provides several advantages as compared to conventional steering assemblies. Because the effective length of the tie rod assembly 78 increases as the vehicle turns from a forward facing direction, toe out is reduced along with the resulting tire wear. Moreover, the increase in the effective length of the tie rod assembly 78 allows a greater offset of the tie rod balls in the tie rod ends 104, 106 thereby creating additional clearance with the drums of conventional drum brake systems. As a result, there is no need to sacrifice optimal steering geometries as in conventional systems. Finally, a single forging may be used for the tie rod arms 60, 62, thereby reducing tooling, inventory, and maintenance costs as compared to conventional steering assemblies.

While the invention has been particularly shown and described with reference to the preferred embodiments thereof, it is well understood by those skilled in the art that various changes and modifications can be made in the invention without departing from the spirit and scope of the invention.

We claim:

1. A steering assembly for adjusting the steer angle of first and second steered wheels in a vehicle, comprising:

a first tie rod having an inboard end and an outboard end, said outboard end of said first tie rod coupled to said first wheel;

a second tie rod having an inboard end and an outboard end, said outboard end of said second tie rod coupled to said second wheel;

wherein said inboard end of said first tie rod is located forward of said outboard end of said first tie rod relative to the forward direction of travel of said vehicle when said first and second wheels are facing forward and a distance between said outboard end of said first tie rod and said outboard end of said second tie rod increases as said first and second wheels are turned from a forward facing direction.

2. The steering assembly of claim 1, further comprising a movable support member, said inboard ends of said first and second tie rods coupled to said support member.

3. The steering assembly of claim 2 wherein said support member is coupled to an axle supporting said first and second wheels.

4. The steering assembly of claim 2 wherein said movable support member moves parallel to a longitudinal axis of an axle supporting said first and second wheels.

5. The steering assembly of claim 1 wherein said inboard end of said first tie rod is located forward of said outboard end of said second tie rod relative to the forward direction of travel of said vehicle when said first and second wheels are facing forward.

6. The steering assembly of claim 1 wherein said outboard end of said first tie rod is located forward of said inboard end of said first tie rod when said first and second wheels are turned a predetermined angle.

7. A steering assembly for adjusting the steer angle of first and second steered wheels in a vehicle, comprising:

a first tie rod having an inboard end and an outboard end, said outboard end of said first tie rod coupled to said first wheel;

a second tie rod having an inboard end and an outboard end, said outboard end of said second tie rod coupled to said second wheel;

wherein said inboard end of said first tie rod is located forward of said outboard end of said first tie rod relative to the forward direction of travel of said vehicle and said inboard end of said second tie rod is located forward of said outboard end of said second tie rod relative to the forward direction of travel of said vehicle when said first and second wheels are facing forward and a distance between said outboard end of said first tie rod and said outboard end of said second tie rod increases when said first and second wheels are turned from a forward facing direction.

8. The steering assembly of claim 7, further comprising a movable support member, said inboard ends of said first and second tie rods coupled to said support member.

9. The steering assembly of claim 8 wherein said support member is coupled to an axle supporting said first and second wheels.

10. The steering assembly of claim 8 wherein said movable support member moves parallel to a longitudinal axis of an axle supporting said first and second wheels.

11. The steering assembly of claim 7 wherein said inboard end of said first tie rod is located forward of said outboard end of said second tie rod relative to the forward direction of travel of said vehicle when said first and second wheels are facing forward.

12. The steering assembly of claim 7 wherein said outboard end of said first tie rod is located forward of said inboard end of said first tie rod when said first and second wheels are turned a predetermined angle.

13. A steering assembly for adjusting the steer angle of first and second steered wheels in a vehicle, comprising:

a first steering knuckle supporting said first wheel;

a second steering knuckle supporting said second wheel;

a steering gear coupled to one of said first and second steering knuckles;

a first tie rod having an inboard end and an outboard end, said outboard end of said first tie rod coupled to said first steering knuckle;

a second tie rod having an inboard end and an outboard end, said outboard end of said second tie rod coupled to said second steering knuckle;

wherein said inboard end of said first tie rod is located forward of said outboard end of said first tie rod relative to the forward direction of travel of said vehicle when said first and second wheels are facing forward and a distance between said outboard end of said first tie rod and said outboard end of said second tie rod increases when said first and second wheels are turned from a forward facing direction.

14. The steering assembly of claim 13, further comprising a movable support member, said inboard ends of said first and second tie rods coupled to said support member.

15. The steering assembly of claim 14 wherein said support member is coupled to an axle supporting said first and second wheels.

16. The steering assembly of claim 14 wherein said movable support member moves parallel to a longitudinal axis of an axle supporting said first and second wheels.

17. The steering assembly of claim 13 wherein said inboard end of said first tie rod is located forward of said outboard end of said second tie rod relative to the forward direction of travel of said vehicle when said first and second wheels are facing forward.

18. The steering assembly of claim 13 wherein said outboard end of said first tie rod is located forward of said inboard end of said first tie rod when said first and second wheels are turned a predetermined angle.

\* \* \* \* \*